United States Patent
Harmon

(10) Patent No.: US 7,450,012 B2
(45) Date of Patent: Nov. 11, 2008

(54) RFID READER/WRITER DEVICE

(75) Inventor: William H. Harmon, Winnetka, CA (US)

(73) Assignee: Precision Dynamics Corporation, San Fernando, CA (US)

(*) Notice: Subject to any disclaimer, the term of this patent is extended or adjusted under 35 U.S.C. 154(b) by 331 days.

(21) Appl. No.: 10/908,041

(22) Filed: Apr. 26, 2005

(65) Prior Publication Data
US 2005/0269407 A1     Dec. 8, 2005

Related U.S. Application Data

(60) Provisional application No. 60/566,295, filed on Apr. 28, 2004.

(51) Int. Cl.
*G08B 13/14* (2006.01)
(52) U.S. Cl. .............. 340/572.8; 340/572.1; 340/572.4; 340/10.1; 340/10.3; 340/10.52; 340/5.2; 235/375; 235/376; 235/380; 705/43
(58) Field of Classification Search .............. 340/572.1, 340/572.2, 572.4, 572.8, 10.1, 10.3, 10.51, 340/10.52, 5.2, 5.41; 235/375, 379, 380, 235/376; 705/43, 66
See application file for complete search history.

(56) References Cited

U.S. PATENT DOCUMENTS 5,629,981 A * 5/1997 Nerlikar ..................... 713/168
5,640,002 A   6/1997 Ruppert et al.
5,837,988 A   11/1998 Bobba et al.
6,102,290 A   8/2000 Swartz et al.
6,264,106 B1  7/2001 Bridgelall
6,517,000 B1  2/2003 McAllister et al.
6,918,483 B2 * 7/2005 Washington et al. ......... 194/350
6,961,000 B2 * 11/2005 Chung ..................... 340/572.1
7,004,385 B1 * 2/2006 Douglass ..................... 235/379
2005/0234778 A1 * 10/2005 Sperduti et al.

* cited by examiner

*Primary Examiner*—Hung T. Nguyen
(74) *Attorney, Agent, or Firm*—Kelly, Lowry & Kelley, LLP

(57) ABSTRACT

The device of the present invention is a stand alone radio frequency identification (RFID) reader/writer device comprising a micro controller having non-volatile data memory, an RFID module, at least one input/output port, and a display. The device of the present invention is fully configurable and may serve as a multi-functional transaction sentry, i.e., a ticket taker, a money or point collector, a money or point dispenser, an access controller, a balance inquiry station, a transaction logger, etc. The method of the present invention comprises steps for configuring, operating and collecting data from the RFID reader/writer device of the present invention. The configuration, operation or data collection from the RFID device of the present invention may be performed by using either the RFID module or the at least one input/output port.

25 Claims, 4 Drawing Sheets

RFID READER/WRITER DEVICE

BACKGROUND OF THE INVENTION

The present invention generally relates to reader/writer devices. More particularly, the present invention relates to a stand alone radio frequency identification (RFID) reader/writer device.

There are several circumstances wherein a fully automated task performed by a reader/writer device would be beneficial. For example, a ticket taker, such as at an amusement park; a money or point collector; a money or point dispenser; an access controller; and a balance inquiry station and the like.

There do exist various prior art devices that enable a person to enter an otherwise inaccessible area. For example, by swiping a magnetic-striped card or passing an RFID card in front of a reader, a gate or door is unlocked or opened. However, such prior art devices are always connected to a central controller, i.e., a computer or other processor, that controls the operation of the device. In addition, no feedback other than the illumination of a light emitting diode (LED) is provided. In certain circumstances, it would be particularly useful to provide feedback to the user of the device. Accordingly, there is a continuing need for a RFID reader/writer device that can operate as a stand alone device, be fully configurable and multi-functional and provide feedback to the user thereof. The present invention fulfills these needs and provides other related advantages.

SUMMARY OF THE INVENTION

The device of the present invention is a stand alone RFID reader/writer device comprising a micro controller having non-volatile data memory, an RFID module, at least one input/output port, and a display. The device is fully configurable and may serve as a multi-functional transaction sentry, i.e., a ticket taker, a money or point collector, a money or point dispenser, an access controller, a balance inquiry station, a transaction logger, etc.

In a preferred embodiment, the device requires a direct current power source and a one time configuration of the micro controller. The at least one input/output port may comprise a serial communication port and may also be capable of discrete output control or logic output, i.e., TTL compatible. A user may also connect a printer or other output device to the at least one input/output port.

The display mentioned above may comprise a three-color LED light and/or a monitor, or both, connected to the at least one input/output port or directly to the micro controller. In addition, the device of the present invention may include a programmable, audible annunciator.

The micro controller and RFID module may be enclosed within a housing sealed against dust and water. A person of ordinary skill in the art will realize that when the housing is present, the at least one input/output port must pass through the housing in order to be externally accessible. In addition the display, whether an LED light or a monitor must be visible from outside the housing.

The non-volatile data memory is configured to store data whether encrypted or unencrypted. Where the stored data is encrypted it may be encrypted using an encryption key involving a unique identification code (UID) of a high frequency transponder, in this case, found in an RFID card held by a user.

Operating the stand alone RFID reader/writer device of the present invention comprises initializing the device, reading, verifying and processing a user ID and user data contained on a user card, storing transactional data about the reading and processing of the user data and collecting the transactional data from the device. The initialization of the device may be performed by reading configuration data from a configuration card by means of the RFID module. In an alternative embodiment, the device may be initialized by connecting a configuration device to the at least one input/output port and uploading the configuration data to the micro controller.

Similarly, the transactional data may be collected from the reader/writer device by means of a data collection card accessed by the RFID module. Alternatively, the transactional data may be downloaded from the reader/writer device by connecting a collection device to the input/output port.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
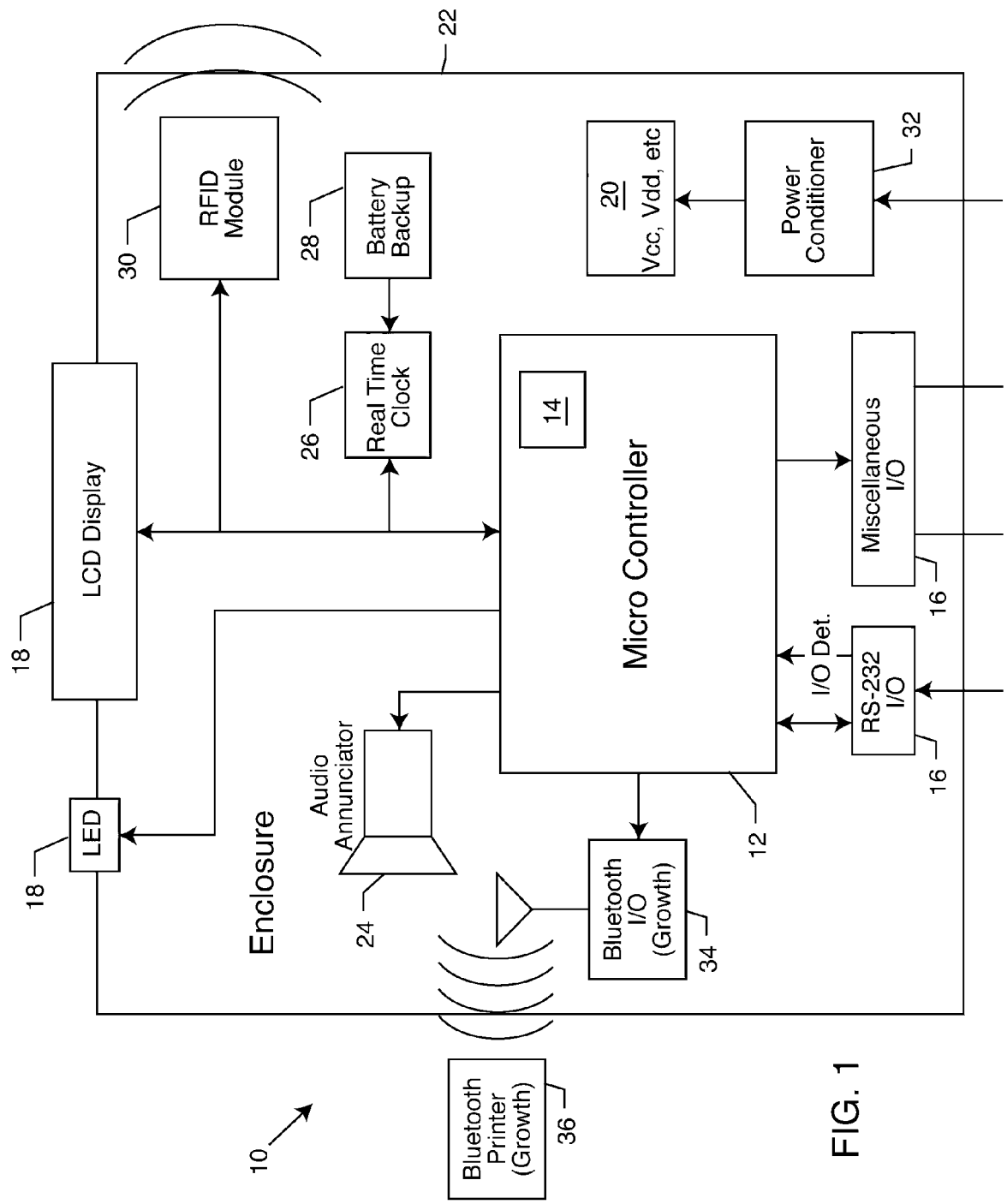
FIG. 1 is a schematic diagram of the stand alone RFID reader/writer device of the present invention.

The device of the present invention is a stand alone RFID reader/writer device 10 designed so as to be fully configurable and serve as a multi-functional transactional sentry. Referring to FIG. 1, a schematic diagram of the device 10 is illustrated.

The stand alone RFID reader/writer device 10 comprises a micro controller 12 having non-volatile data memory 14, an RFID module 30 in communication with the micro controller 12, at least one input/output port 16 electrically connected to the micro controller 12, and a display 18 electrically connected to the micro controller 12. The micro controller 12 directs all operations of the reader/writer device 10. The RFID module 30 may be any device known in the art capable of sending and receiving radio frequency signals, whether active or passive, to achieve the purposes of the invention. A person having ordinary skill in the art will know the features required for the RFID module 30. The RFID module 30 is in communication with the micro controller 12. This communication may take the form of a hard wire electronic connection or a wireless radio frequency connection.

Such device 10, by virtue of its stand alone characteristic, requires only a DC power source 20 and a one time configuration either by a radio frequency configuration device or a hard wire connection. Such hard wire connection interfaces may be made by an RS-232 or an RS-485 interface via the at least one input/output port 16. The configuration of the device 10 will be discussed in more detail below.

When properly configured, the micro controller 12 of the present invention is capable of debit or credit of an RFID credential in a fixed but configurable amount. The non-volatile data memory 14 maintains a log of a universal identification code (UID) from an RFID credential, as well as, the date, time, and balance information for each transaction. The device 10 is capable of displaying any of the above listed information on an internal or external display 18. The display 18 may be by a back-lit LCD display electrically connected to the micro controller 12. Alternatively, the display 18 may comprise a multi-color LED light similarly connected to the micro controller 12. In the preferred embodiment, the display 18 is both a three-color LED light capable of displaying red, green and amber lights and a back-lit LCD display.

For security purposes, all data stored in the non-volatile data memory 14 may be encrypted or encoded using an encryption/encoding key involving a unique identification code (UID) of a high frequency transponder in a user card. For tracking purposes, the device 10 of the present invention is marked with a part number and serial number. The serial number of the device 10 and the version of firmware contained in the micro controller 12 is accessible through the at least one input/output port 16 via serial communication with the micro controller 12.

The device 10 of the present invention may also include a housing 22 which encloses at least the micro controller 12 and the RFID module 30. The three-color LED display 18 mentioned above, is preferably visible through the top surface of the housing 22. The device 10 is configurable to be mounted on either a wall or on a table top. The housing 22 may be potted so as to be dust tight and resistant to water intrusion, thus making the device 10 capable of outdoor use.

The device 10 of the present invention preferably has at least one input/output port 16 capable of discrete output control or logic output, i.e., TTL compatibility, for control of external devices. The device 10 also has the capability to hold any output control at the logic level for a programmable amount of time to meet input requirements from external devices, i.e., turnstile, gate, door lock, indicator, etc.

As mentioned above, the non-volatile data memory 14 is accessible for upload or download through either the at least one input/output port 16 or the RFID module 30. The upload of data to the non-volatile data memory 14 is used for configuration (FIG. 3) or operation (FIG. 2) of the device 10. The download of data from the non-volatile data memory 14 is used for data collection (FIG. 4) from the device 10.

The at least one input/output port 16 is preferably a serial communication port having either RS-232 or RS-485 compatibility. The at least one input/output port 16 may also be a serial port compatible with Weigand 26 and 64 bit devices having 2 wire output having TTL compatibility as discussed above.

In another preferred embodiment the device 10 includes a programmable, audible annunciator 24 electrically connected to the micro controller 12 and configured to generate a sound indicating acceptance or rejection of an RFID credential or the end of processing of data contained on an RFID credential. A printer may be connected to the at least one input/output port 16 permitting the generation of a paper receipt or a dump of the data contained in the non-volatile data memory 14.

In another preferred embodiment, the device 10 may include BLUETOOTH wireless networking technology. BLUETOOTH is of particular applicability because of its combination of low power, medium range and small size capabilities. A BLUETOOTH local network is a short range wireless communication network as defined by the BLUETOOTH standard. See the website http://www.bluetooth.com on the Internet for additional details about the BLUETOOTH local network. The BLUETOOTH standard defines how compatible devices will communicate with each other. Generally, an integrated circuit incorporates a radio transceiver, the BLUETOOTH control circuitry, and the communications protocol. The BLUETOOTH technology makes connections quickly and without cable. An example of a device intended to communicate to a BLUETOOTH network is PCT Patent titled "An Object Detection System," International Publication No. WO 01/37004 A1, International Application No. PCT/DK00/00637.

In this instance, the BLUETOOTH protocol provides for the wireless communication of data signals. The device 10 of the present invention may include a BLUETOOTH i/o device 34 in communication with the micro controller 12, for wirelessly transmitting and receiving data signals. The BLUETOOTH i/o device 34 may be in communication with a printer 36 incorporating BLUETOOTH wireless technology. In alternate embodiments, the BLUETOOTH i/o device 34 may replace the RFID module 30 altogether.

The device 10 of the present invention may also include a real time clock 26 with a battery backup 28. The clock 26 and battery 28 supply time data to the micro controller 12 to assist in the operation and data/time-stamping features of the device 10. The device 10 may be programmed to accept only certain RFID credentials within specified time and date parameters. The device 10 may also include a power conditioner 32 which generates a supply or operating voltage (VCC, VDD, etc.) from an external power source (not shown).

Figure 2:
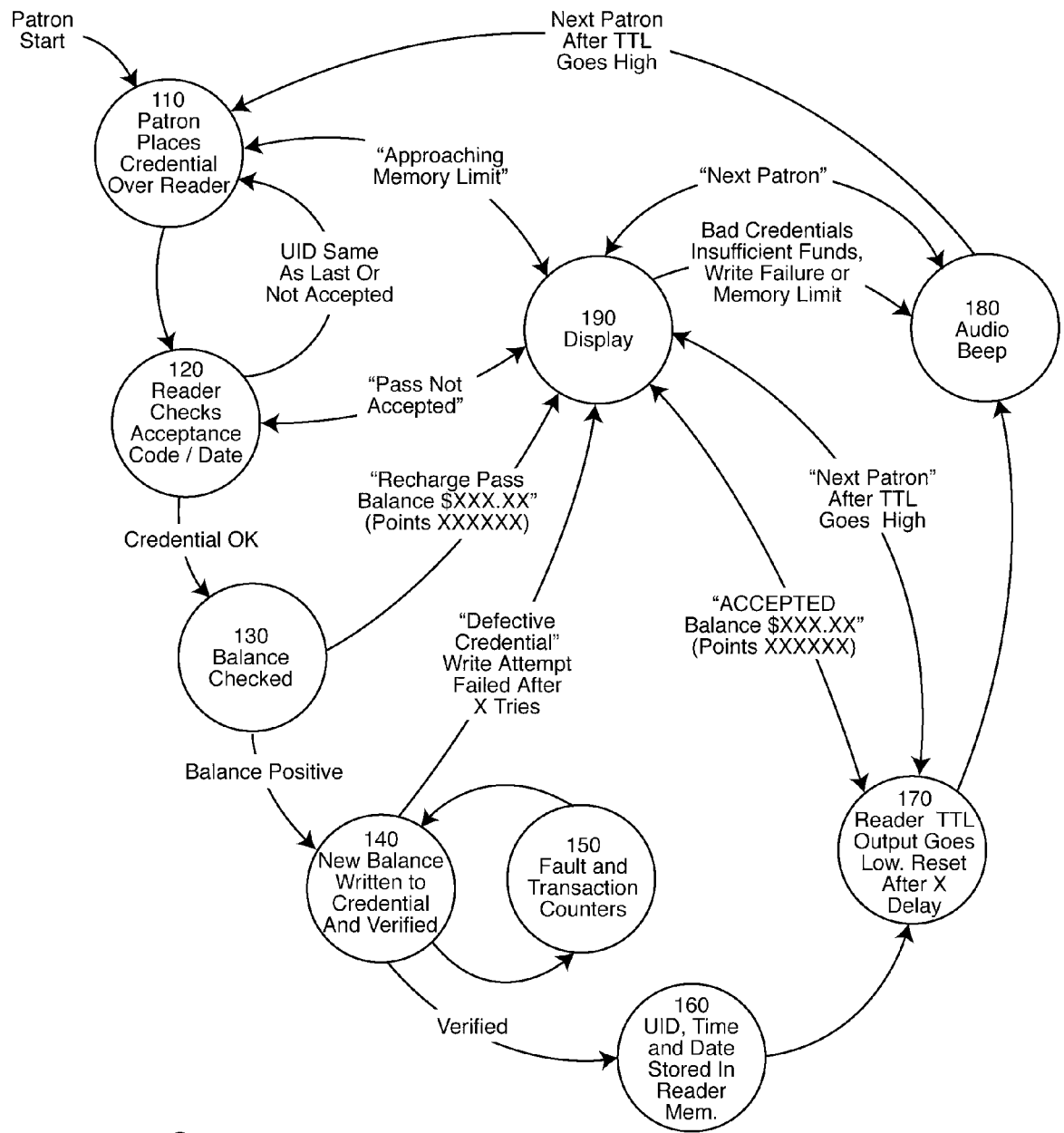
FIG. 2 is a schematic diagram illustrating the operation of the RFID reader/writer device of the present invention.
Figure 3:
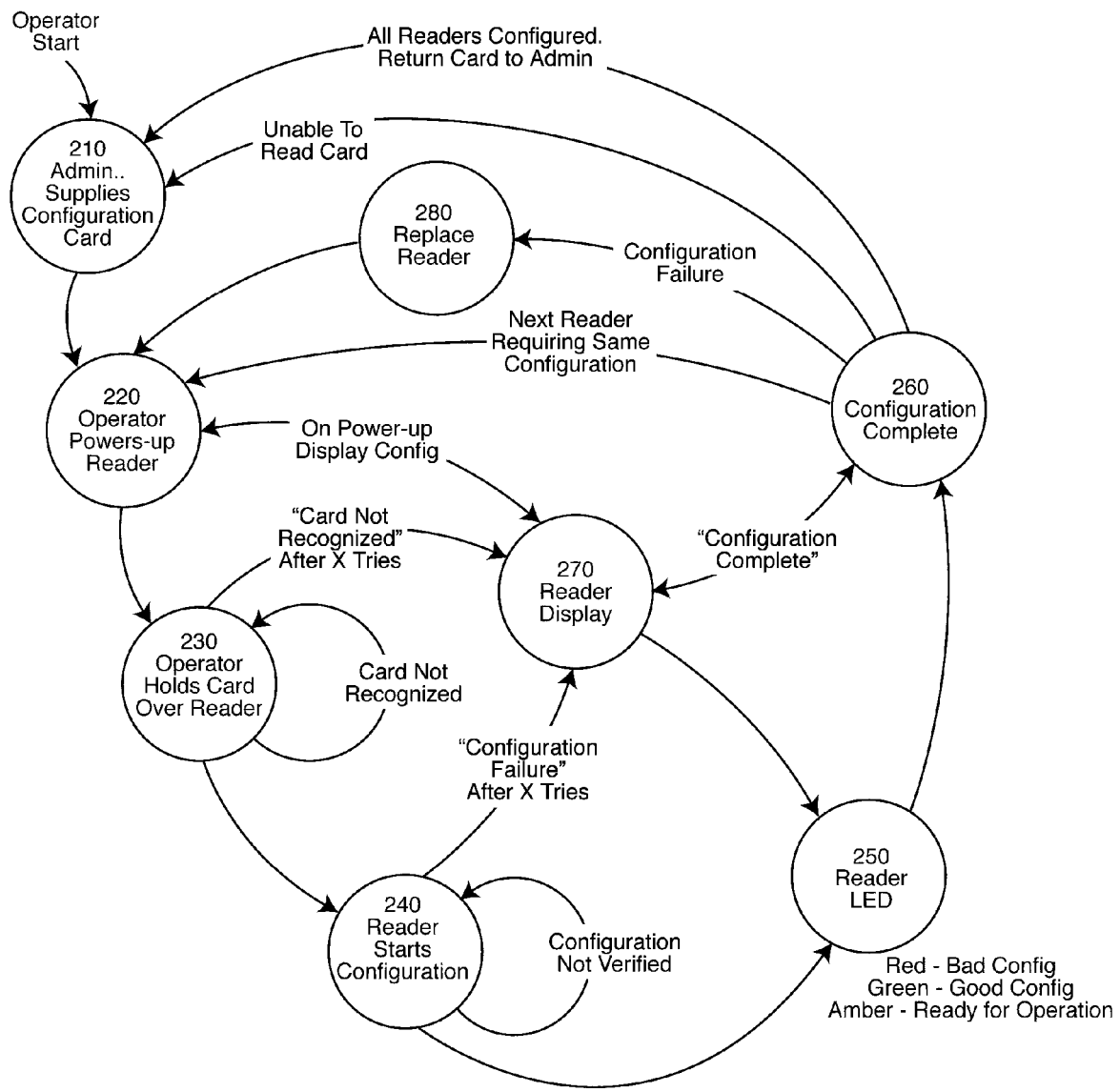
FIG. 3 is a schematic diagram illustrating the configuration of the reader/writer device of the present invention.
Figure 4:
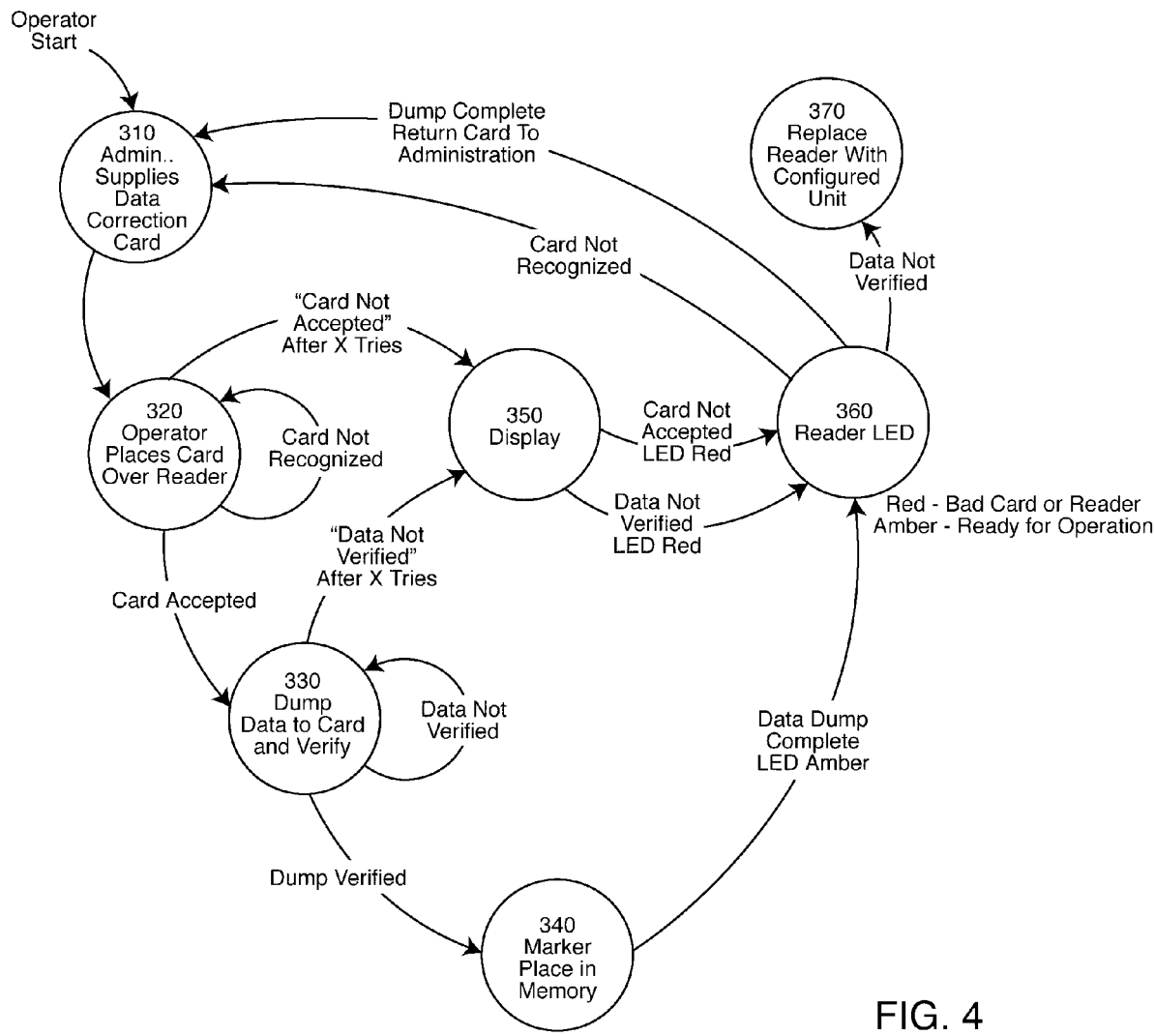
FIG. 4 is a schematic diagram illustrating the collection of data from an RFID reader/writer device of the present invention.

Referring now to FIGS. 2-4, the operation of, configuration of, and data collection from the device 10 is illustrated. FIG. 2 illustrates the preferred operation method of the device 10. The display 18 associated with the device 10 initially displays a ready indication, usually an amber light on a LED display, letting a user know that the device 10 is waiting for an RFID credential to be placed within its read range. When the user presents (110) an RFID credential, the RFID module 30 reads (120) and the micro controller 12 verifies (120) a UID stored on the RFID credential. If the micro controller 12 cannot properly verify the UID, the device 10 provides an output response (190) indicating that the verification was unsuccessful. The output response may take the form of a red light on an LED display 18, a textual message on a LCD display 18, or a tone from an audible annunciator 24. The user must then re-present (110) the RFID credential until the micro controller 12 can properly verify the UID.

If the verification of the UID is successful, the RFID module 30 then reads (130) and the micro controller 12 processes (130, 140) user data stored on the RFID credential according to a configuration program in the micro controller 12. The processing of the user data includes analyzing and modifying the user data, writing the modified user data to the RFID credential and verifying that the modified user data was properly written to the RFID credential. The details of analyzing and modifying the user data vary depending upon the configuration program in the micro controller 12. For example, if the micro controller 12 is configured as a debit/credit program then the device 10 adds or subtracts a fixed, pre-configured amount from a balance contained in the user data.

If the analyzing and modifying of the user data results in a negative balance, then the display 18 indicates (190) that the transaction was not completed by presenting a red LED light, or a textual display, or a hard copy printed receipt. If the analyzing and modifying of the user data results in a positive balance, then the balance contained in the user data is modified and the modified user data is written to the RFID credential and the written modified user data is verified (140). If the verification of the modified user data written to the RFID credential is successful, then the display 18 indicates (190) the same by presenting a green LED light, a textual display, or a hard copy printed receipt. In a preferred embodiment, the TTL output from the device 10 activates an external device (170) and the display 18 displays (190) a message notifying the user of the modified balance and that he or she has been authorized to proceed. The external device is activated for a fixed but configurable duration of time (170).

Transactional data regarding the reading and processing of the user data is stored (160) in the non-volatile data memory 14. In a preferred embodiment, the transactional data includes the last four bytes of the RFID credential UID and the date and time of the transaction. After the user proceeds past the external device, the TTL output from the device 10 deactivates the external device and the display again presents (190) a ready notification. As before, the ready notification may take the form of an amber LED light. The operation process may then be repeated for the next user.

A device 10 must be initialized prior the method of operation described above. Initialization of the device 10 is illustrated in FIG. 3. Initialization of a device 10 comprises the steps of presenting (230) a configuration program having a configuration ID and configuration data to the device 10, reading and verifying the configuration ID (230), displaying the results of the reading and verification of the configuration ID (270), reading the configuration data (240), writing the configuration data (240) to the non-volatile data memory 14, verifying the configuration data (240) written to the non-volatile data memory 14 and displaying (250, 270) the results of the reading, writing and verification of the configuration data.

In a preferred embodiment, the presenting of a configuration program (230) comprises placing a RFID configuration card having the configuration ID and configuration data in close proximity to the RFID module 30. In an alternate embodiment, the presenting of a configuration program (230) comprises connecting a configuration device containing the configuration program to the at least one input/output port 16. In either embodiment, the configuration ID is read and the micro controller 12 verifies the configuration ID associated with the configuration program. If the verification of the configuration ID is negative, a user receives an appropriate response, i.e., a red LED light or a textual display. If the configuration ID is rejected, the user must re-present the configuration program until the configuration ID is accepted.

If the verification of the configuration ID is positive, the device 10 may display an appropriate response, i.e., an amber LED light or a textual display. The configuration data is then read (240), whether by the RFID module 30 or through the at least one input/output port 16 and written to the non-volatile data memory 14. The micro controller 12 verifies the accuracy of the configuration data written to the non-volatile data memory 14 and configures itself using the data (240). The display 18 indicates whether the reading, writing and verification of the configuration data was successful (250). In the preferred embodiment, a display indicating unsuccessful results is a red LED light or a textual display. A display indicating a successful result is either a green LED light or a textual display. After the device 10 is configured, it is ready for the method of operation described above.

After an operation session has concluded, the transactional data contained in the device 10 may be collected. The collection of transactional data from a device 10 is illustrated in FIG. 4. The collection process comprises the steps of presenting (320) a data collection device having a data collection ID to the device 10, reading and verifying the data collection ID (320) and displaying (350) the results of the reading and verification, writing the transactional data (330) contained in the non-volatile data memory 14 to the data collection device and verifying (330) the transactional data written to the data collection device, displaying the results of the writing and verification of the transactional data (350, 360), and marking (340) the end of the transactional data in the non-volatile data memory 14.

In a preferred embodiment, the presenting of a data collection device (320) comprises placing a data collection card having a data collection ID in close proximity to the RFID module 30. In an alternate embodiment, the presenting of a data collection device (320) comprises connecting a data collection device having a data collection ID to the at least one input/output port 16. In either embodiment, the data collection ID is read and the micro controller 12 verifies the data collection ID associated with the data collection device. If the verification of the data collection ID is negative, the device 10 displays (350) an appropriate response, i.e., a red LED light or a textual display. If the data collection ID is rejected, the user must re-present the data collection device until the data collection ID is accepted.

If the verification of the data collection ID is positive, the device 10 displays (350) an appropriate response, i.e., an amber LED light or a textual display. The transactional data is then written (330), whether by the RFID module 30 or through the at least one input/output port 16, to the data collection device. The micro controller 12 then verifies (330) the accuracy of the transactional data written to the data collection device. The display 18 indicates (350) whether the writing and verification of the transactional data was successful. In the preferred embodiment, a display indicating unsuccessful results is a red LED light or a textual display. A display indicating a successful result is either a green LED light or a textual display.

In the preferred embodiment, the transactional data written to the data collection device is an abbreviated form of the data. The transactional data includes the total number of transactions and hourly distribution numbers. If a printer is connected to the at least one input/output port 16, the device 10 may be configured to automatically print the transactional data from the non-volatile data memory 14. When the transactional data is collected, none of the data in the non-volatile data memory 14 is erased. A marker placed at the end of the transactional data marks (340) the end of the stored data indicating that new data may be added after the marked point.

Although several embodiments have been described in detail for purposes of illustration, various modifications may be made without departing from the scope and spirit of the invention.

What is claimed is:

1. A method of operating a stand-alone radio frequency identification reader/writer device having an RFID module and non-volatile data memory, comprising the steps of:
   initializing the stand-alone radio frequency identification reader/writer device;
   placing a user card having a user ID and user data, in close proximity to the RFID module;
   reading and verifying the user ID;
   displaying results of the reading and verification of the user ID;
   reading and processing the user data;
   displaying results of the reading and processing of the user data;
   storing, in the non-volatile data memory, transactional data about the reading and processing of the user data;
   displaying a ready notification for reading of the next user card on the reader/writer device; and
   collecting the transactional data from the non-volatile data memory.

2. The method of claim 1, wherein the initializing step comprises the steps of:
- presenting a configuration program having a configuration ID and configuration data, to the stand-alone radio frequency identification reader/writer device;
- reading and verifying the configuration ID;
- displaying results of the reading and verification of the configuration ID;
- reading the configuration data;
- writing the configuration data to the non-volatile data memory;
- verifying the configuration data written to the non-volatile data memory; and
- displaying results of the reading, writing and verification of the configuration data.

3. The method of claim 2, wherein presenting a configuration program comprises placing an RFID configuration card having a configuration ID and configuration data in close proximity to the RFID module.

4. The method of claim 2, wherein presenting a configuration program comprises connecting a configuration device having a configuration ID and configuration data to an input/output port on the reader/writer device.

5. The method of claim 2, wherein the initializing step further comprises the step of restarting the initialization step until the verification of the configuration ID is positive prior to reading the configuration data.

6. The method of claim 2, wherein the initializing step further comprises the step of restarting the initialization step until the verification of the configuration data is positive prior to displaying the results of the reading, writing and verification of the configuration data.

7. The method of claim 6, wherein presenting a data collection device comprises placing a data collection card having a data collection ID in close proximity to the RFID module.

8. The method of claim 6, wherein presenting a data collection device comprises connecting a data collection device having a data collection ID to an input/output port on the reader/writer device.

9. The method of claim 6, wherein the collecting step further comprises the step of restarting the collection step until the verification of the data collection ID is positive prior to writing the transactional data to the data collection card.

10. The method of claim 6, wherein the collecting step further comprises the step of restarting the collection step until the verification of the transactional data written to the data collection device is positive prior to marking the transactional data.

11. The method of claim 6, wherein the collecting step further comprises the step of printing the transactional data from the non-volatile data memory prior to marking the transactional data.

12. The method of claim 11, wherein the initializing step further comprises the step of restarting the initialization step until the verification of the configuration ID is positive prior to reading the configuration data.

13. The method of claim 11, wherein the initializing step further comprises the step of restarting the initialization step until the verification of the configuration data is positive prior to displaying the results of the reading, writing and verification of the configuration data.

14. The method of claim 11, wherein the collecting step further comprises the step of restarting the collection step until the verification of the data collection ID is positive prior to writing the transactional data to the data collection card.

15. The method of claim 11, wherein the collecting step further comprises the step of restarting the collection step until the verification of the transactional data written to the data collection card is positive prior to marking the transactional data.

16. The method of claim 11, wherein the collecting step further comprises the step of printing the transactional data from the non-volatile data memory prior to marking the transactional data.

17. The method of claim 11, further comprising the step of pausing for a configurable duration of time prior to displaying the ready notification.

18. The method of claim 11, further comprising the step of printing a hard copy printout of the results of the reading and processing of the user data prior to displaying the ready notification.

19. The method of claim 11, further comprising the step of printing a receipt showing the results of the reading and processing of the user data prior to displaying the ready notification.

20. The method of claim 1, wherein processing the user data comprises the steps of:
- analyzing and modifying the user data;
- writing the modified user data to the user card; and
- verifying the modified user data written to the user card.

21. The method of claim 1, wherein the collecting step comprises the steps of:
- presenting a data collection device, having a data collection ID, to the stand-alone radio frequency identification reader/writer device;
- reading and verifying the data collection ID;
- displaying results of the reading and verification of the data collection ID;
- writing the transactional data to the data collection device;
- verifying the transactional data written to the data collection device;
- displaying results of the writing and verification of the transactional data; and
- marking the transactional data in the non-volatile data memory.

22. The method of claim 1, further comprising the step of pausing for a configurable duration of time prior to displaying the ready notification.

23. The method of claim 1, further comprising the step of printing a hard copy printout of the results of the reading and processing of the user data prior to displaying the ready notification.

24. The method of claim 1, further comprising the step of printing a receipt showing the results of the reading and processing of the user data prior to displaying the ready notification.

25. A method of operating a stand-alone radio frequency identification reader/writer device having an RFID module and non-volatile data memory, comprising the steps of:
- initializing the stand-alone radio frequency identification reader/writer device by, placing a configuration card having a configuration ID and configuration data, in close proximity to the RFID module, reading and verifying the configuration ID, displaying results of the reading and verification of the configuration ID, reading the configuration data writing the configuration data to the non-volatile data memory, verifying the configuration data written to the non-volatile data memory, and displaying results of the reading, writing and verification of the configuration data;
- placing a user card having a user ID and user data, in close proximity to the RFID module;
- reading and verifying the user ID;

displaying results of the reading and verification of the user ID;

reading the user data;

processing the user data by, analyzing and modifying the user data, writing the modified user data to the user card, and verifying the modified user data written to the user card;

displaying results of the reading and processing of the user data;

storing transactional data about the reading and processing of the user data in the non-volatile data memory;

displaying a ready notification for reading of the next user card on the reader/writer device; and collecting the transactional data from the non-volatile data memory by placing a data collection card having a data collection ID in close proximity to the RFID module, reading and verifying the data collection ID, displaying results of the reading and verification of the data collection ID, writing the transactional data to the data collection card, verifying the transactional data written to the data collection card, displaying results of the writing and verification of the transactional data, and marking the transactional data in the non-volatile data memory.

* * * * *